United States Patent Office 3,278,948
Patented Oct. 18, 1966

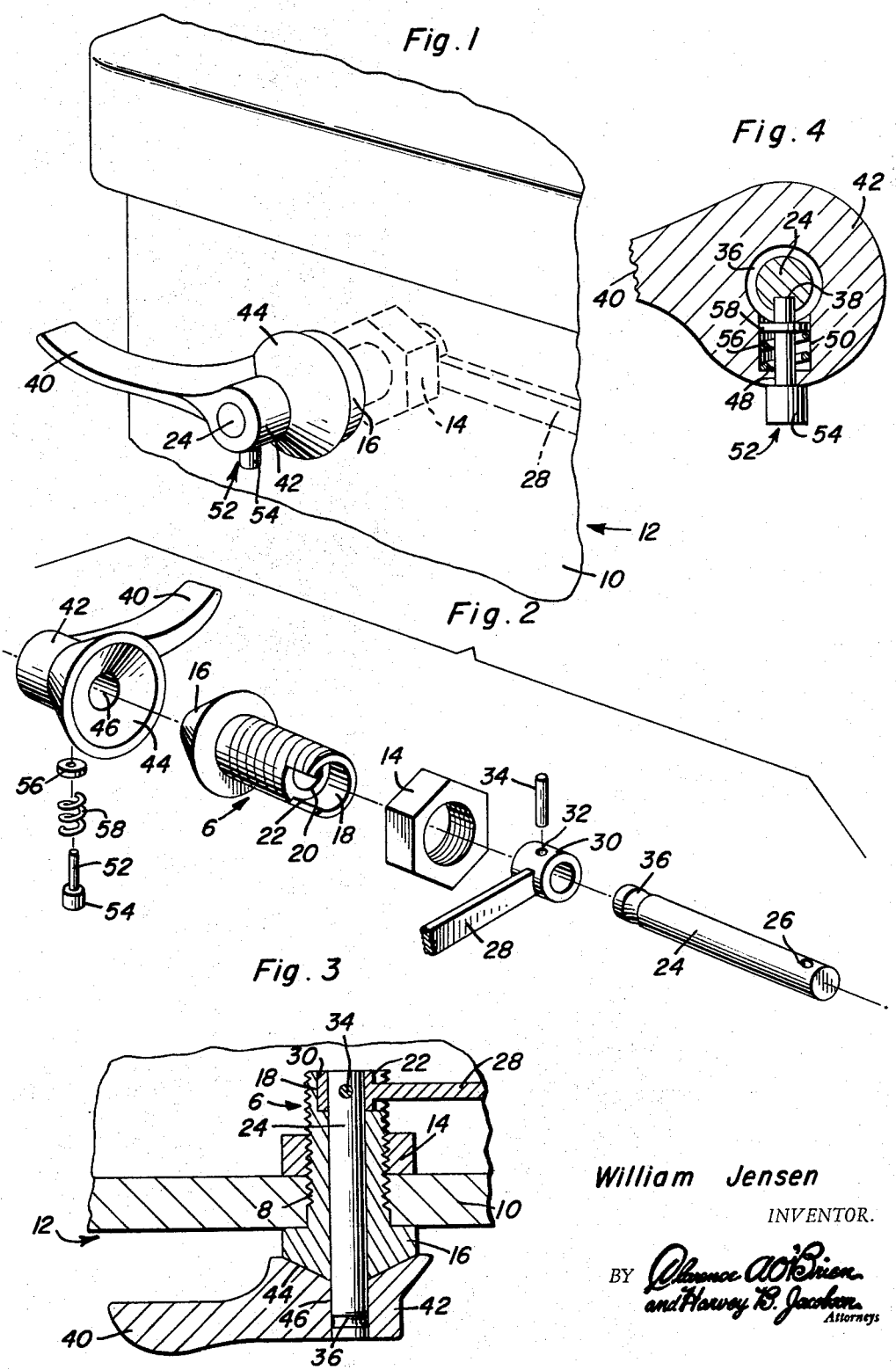

3,278,948
TOILET FLUSHING LEVER WITH
LATCHING MEANS
William Jensen, 3425 Edison Ave., Carmichael, Calif.
Filed July 29, 1964, Ser. No. 386,024
5 Claims. (Cl. 4—67)

This invention relates to new and useful improvements in flush valve operators and has for its primary object to provide a device of this character which is adapted to be expeditiously installed for operation on a conventional toilet flush tank with unskilled labor and without the necessity of using special tools.

Another important object of the present invention is to provide, in a manner as hereinafter set forth, a flush valve operator of the character described which, if desired, may be quickly removed from the flush tank.

Still another highly important object of the present invention is to provide, in a flush valve operator comprising a tubular bearing or bushing mounted in an opening provided therefor in the front of the tank, a shaft rotatably journaled therein and a trip arm or lever operable by said shaft, novel means for securing said trip arm or lever on said shaft.

Other objects are to provide an improved flush valve operator of the character set forth which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a flush valve operator constructed in accordance with the present invention assembled on a toilet flush tank;

FIGURE 2 is a perspective view of the device showing the parts separated;

FIGURE 3 is a view in horizontal section through the installed device; and

FIGURE 4 is a vertical sectional view through the outer portion of the device, showing the means for detachably securing the handle in position.

Referring now to the drawing in detail, it will be seen that the embodiment of the present invention which has been illustrated comprises a threaded tubular bearing or bushing 6 of suitable metal or other material which is removably mounted in an opening 8 which is provided therefor in the upper portion of the front wall 10 of a conventional toilet flush tank 12. The lock nut 14 on the inner portion of the bushing 6 abuts the inner face of the tank wall 10 for securing said bushing in position.

On its outer end the bushing 6 comprises a generally conical head 16. As illustrated to advantage in FIGURE 2 of the drawing, the inner end portion of the tubular bearing or bushing 6 is counterbored to form what may be considered a socket 18, thus providing a shoulder 20. A radial opening or notch 22 in the inner end portion of the bushing 6 communicates with the socket 18.

Journaled for rotation in the bushing 6 is a removable shaft 24. The shaft 24 projects into the socket 18 and has formed therein a diametrically extending opening 26. A flush valve trip arm or lever 28 is provided on one end with a cylindrical eye or sleeve 30 which is mounted on the inner end portion of the shaft 24 in the socket 18 in abutting engagement with the shoulder 20. The notch or opening 22 in the inner end portion of the bushing 6 accommodates the arm 28. The cylindrical eye or sleeve 30 is provided with aligned openings 32 which register with the opening 26 for the reception of a pin 34 for securing the arm 28 on the shaft 24 for actuation thereby. Of course, the notch or opening 22 in the bushing 6 is of a width to permit sufficient vertical swinging movement of the arm 28.

The outer end portion of the shaft 24 projects beyond the head 16 and has formed therein a circumferential groove or channel 36. In the bottom of the groove or channel 36, the shaft 24 is further provided with a socket 38 (see FIGURE 4).

A lever-type operating handle 40 is removably mounted on the projecting outer end portion of the shaft 24. The handle 40 includes a hub or inner end portion 42 which receives the shaft 24. The inner end or face of the hub 42 is provided with a conical socket or recess 44 in which the head 16 of the bushing 6 seats. This is shown to advantage in FIGURE 3 of the drawing.

The shaft bore or opening 46 in the hub 42 communicates with the conical recess 44 at the apex thereof. A radial opening 48 in the hub 42 extends from the periphery thereof to the opening 46. The major portion of the opening 48 is counterbored or enlarged in a manner to provide a socket or the like 50.

A locking pin 52 comprising on its outer end a serrated head 54 is operable in the opening 48 and the socket 50 for engagement in the socket 38 for removably securing the handle 40 on the shaft 24. An abutment 56 is affixed to the inner portion of the pin 52 and is operable in the socket 50. A coil spring 58 encircles the pin 52 in the socket 50 and is engaged under compression with the abutment or stop 56 for yieldingly urging said pin 52 inwardly for engagement in the socket 38.

It is thought that the operation of the device will be readily apparent from a consideration of the foregoing. Briefly, the threaded bushing 6 is inserted in the opening 8 and secured by the lock nut 14. The sleeve or cylindrical eye 30 of the trip arm 28 is then slipped on the shaft 24 and secured by the pin 34, after which said shaft is inserted in the bushing 6 from the inner end thereof, the socket 18 receiving the sleeve 30 and the opening or notch 22 receiving the trip arm 28. With the pin 52 held in retracted position against the action of the spring 58, the hub 42 of the handle 40 is then slipped on the projecting outer end portion of the shaft 24. The socket or recess 44 seatingly receives the conical head 46 of the bushing 6 and the circumferential groove or channel 36 may receive the now released pin 52. By turning the handle 40 while holding the shaft 24 against rotation, the spring-pressed locking pin 52 may be caused to snap into the socket 38 in an obvious manner thereby releasably locking the handle on the shaft. The construction and arrangement, it will be observed is such that when the trip arm 28 is at rest said trip arm is supported by the lower wall of the notch or recess 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A toilet flush valve operator comprising a bushing, means for securing said bushing in an opening in a wall of a toilet flush tank, said bushing having a radial notch in its inner end portion communicating with the bore of said bushing, a shaft rotatably mounted in the bushing, a trip arm on the inner end portion of said shaft operable in the notch and adapted to rest on a wall thereof, means for actuating the shaft, and means for holding the actuating means, the arm and the shaft assembled in the bushing, said shaft and said sleeve having registering openings therein, and a securing pin for the sleeve engaged in the registering openings and retained therein by the bushing.

2. A toilet flush valve operator comprising a bushing, means for securing said bushing in an opening in a wall of a toilet flush tank, said bushing having a radial notch in its inner end portion communicating with the bore of said bushing, a shaft rotatably mounted in the bushing, a trip arm on the inner end portion of said shaft operable in the notch and adapted to rest on a wall thereof, means for actuating the shaft, and means for holding the actuating means, the arm and the shaft assembled in the bushing, said means for securing the bushing in the opening including a substantially conical head on one end of the bushing for abutting the tank wall and a lock nut threaded on the other end portion of the bushing for engaging said tank wall, said actuating means comprising a handle including a hub receiving an end portion of the shaft and having a generally conical socket therein seatingly receiving the bushing head, and a latch in the hub for securing same on the shaft, said shaft having a socket therein, said latch comprising a spring-pressed slidable pin mounted radially in the hub and engageable in the socket.

3. The combination of claim 2, said shaft further having a circumferential groove therein communicating with the socket for guiding the pin thereto.

4. An actuating mechanism for a toilet flush valve comprising a fixedly mounted bushing, a shaft extending through said bushing and projecting from one end thereof, a handle connected to said one end of the shaft in abutting relation to the bushing, said bushing having an end portion internally enlarged about said shaft at the other end thereof, a trip arm connected to the other end of the shaft, limit means formed on said internally enlarged end portion of the bushing at the other end of the shaft for engagement with the trip arm to limit angular movement of the shaft by the handle, and means on the trip arm received within the internally enlarged end portion of the bushing for connecting the trip arm to the shaft.

5. The combination of claim 4 including latch means releasably connecting the handle to the shaft at said one end in a predetermined angular position relative to the trip arm.

References Cited by the Examiner
UNITED STATES PATENTS

| | | | |
|---|---|---|---|
| 2,475,881 | 7/1949 | Crampton | 4—67 |
| 2,489,621 | 11/1949 | Crampton | 4—67 |
| 2,588,072 | 3/1952 | Bachli et al. | 4—67 |

LAVERNE D. GEIGER, *Primary Examiner.*

H. ARTIS, *Examiner.*